United States Patent Office 3,194,725
Patented July 13, 1965

3,194,725
LAMINATE
Lewis Charles Pounds, Cheshire, Conn., assignor to American Cyanamid Company, Stamford, Conn., a corporation of Maine
No Drawing. Filed Sept. 23, 1963, Ser. No. 310,893
6 Claims. (Cl. 161—165)

This invention relates to laminated articles and to methods of preparing the same. More particularly, this invention relates to novel high impact strength, self-extinguishing, thermoplastic laminated articles comprising a substrate of a rigid vinyl chloride polymer, an interlayer of a highly plasticized vinyl chloride polymer and an overlay sheet of a polymer of methyl methacrylate.

Laminated articles for outdoor use should be weather-resistant, i.e., resistant to moisture, dryness, cold and heat, while maintaining the superior structural attributes and decorative appearances found in laminated articles designed for indoor use such as wall panels, table and counter tops and the like. Such structural properties include good impact and flexural strengths, light weight, compactness, thermo-insulating ability and fire resistance. Laminated articels having the foregoing properties, as well as reasonable cost, have long been sought in the industry for a variety of outdoor applications, e.g., architectural structures, transportation, shipping and recreational uses.

Polymethyl methacrylate in sheet form has many attractive properties such as scratch resistance and good weatherability. On the other hand, polymethyl methacrylate will continue to burn after having been ignited in a flame and removed therefrom. Hence, polymethyl methacrylate is not self-extinguishing. Additionally, polymethyl methacrylate does not have a very high impact strength. By way of illustration, a sheet of unnotched polymethyl methacrylate having a thickness of 240 mils had an Izod impact strength of 0.2 ft. lb. per 100 mils thickness. By way of contrast a sheet of rigid polyvinyl chloride, having a thickness of 135 mils had an unnotched Izod impact strength of 0.734 ft. lb. per 100 mils thickness.

The polymethyl methacrylate layer used in the laminate of the present invention should be an extruded sheet. The polymethyl mehacrylate sheeting of the present laminate should have a thickness of between about 1 mil and about 15 mils and preferably between about 3 and 7 mils. Furthermore, the extruded polymethyl methacrylate sheet in aforementioned thicknesses can be bonded to the interlayer and in turn to the core or base material without benefit of any adhesive material formerly considered imperatively necessary since the extruded polymethyl methacrylate sheet, because of its thinness and low softening temperatures, can be made to bond tenaciously to the interlayer and base material by the simple application of heat and pressure to form a laminated article which will not delaminate even after prolonged exposure to the extremes of temperature and humidity.

The base or core material is a rigid sheet of polyvinyl chloride. The rigid sheet has such a significant measure of stiffness as to give the casual observer the impression that it is unplasticized. However, some limited amounts of plasticizer are used in the preparation of this rigid core material which is available from a plurality of sources commercially. This core material should have a relatively high flexural strength as well as a high impact strength. The flexural strength of the rigid polyvinyl chloride sheet should be at least about 13,000 p.s.i. The impact strength, as determined by an unnotched Izod type impact strength test should be at least 0.4 ft. lb. per 100 mils of thickness. The rigid polyvinyl chloride sheet may be cast, calendered or extruded. The polyvinyl chloride sheet used in the core or base layer has the aforementioned outstanding properties of flexural strength and impact strength and in addition, has the outstanding property of flame resistance and self-extinguishability. On the other hand, the rigid polyvinyl chloride sheet has poor weatherability and is not very scratch resistant. The thickness of the core sheet may be varied from about 40 mils to about 250 mils and preferably from about 60 to 150 mils. There is a definite ratio relationship which must be maintained between the thickness of the polymethyl methacrylate surface layer and the thickness of the non-combustible layer(s), whether they be in the core alone or also in the interlayer. That ratio relationship should be at least 1:4 surface layer to non-combustible layer(s), respectively. By this it is meant that if the core member is 40 mils thick, that the surface layer should be not more than 10 mils thick. Still further, there is a preferred, but not mandatory ratio relationship between the thickness of the interlayer and the thickness of the skin or surface layer, in order to maintain a high impact strength in the ultimate laminate. The relationship is between about 2:1/3:1 interlayer to surface layer, respectively. Otherwise, the full measure of surprising and unexpected properties of the laminate of the present invention will not be achieved, namely the retention of the high impact strength of the core material and the self-extinguishability of the total assembly. When the core material is 60 mils or more in thickness, the polymethyl methacrylate surface layer may be any thickness from 1 mil up to about 15 mils while still retaining all of the advantageous properties that each of the separate components contribute to the total laminated assembly without sacrificing any of the desirable properties being sought.

The third and essential component of the laminate of the present invention is the interlayer which is like the filler in the sandwich. This interlayer is a highly plasticized sheet of a polymer of vinyl chloride. This interlayer is a very highly flexible sheet which is soft and supple due to the extent of its plasticization. The interlayer sheet may be varied in thickness between about 2 mils and 25 mils and preferably from about 3–9 mils. Thicknesses of the interlayer greater than 25 mils can readily be used in the structure of the present invention. However, from a cost standpoint, it is not desired to use interlayers that are thicker than 25 mils, since no advantageous properties are achieved by using such a thicker layer over thinner sheets of the interlayer and yet, the cost of the total laminate is increased as thicker layers are used. Hence, the economies of the operation alone dictate the necessity for keeping the thickness of the interlayer within the above-stated limits. Unlike the critical relationship in the ratio between the core layer and the surface layer, the relationship in the ratio between the core material and the interlayer is non-existent. By way of illustration, if one utilized a 40 mil thick core layer, one could use, if desired, a 20 mil thickness of the interlayer and a 10 mil thickness as a maximum of the surface layer or one could use a 40 mil thick core and a 2 mil thick interlayer and a 1 mil thick surface layer.

One of the preferred embodiments of the present invention, resides in a laminated structure having a total of five layers in which the core material of the type defined hereinabove and in that range of thicknesses is surrounded on each of its flat surfaces with a layer of the highly plasticized polyvinyl chloride as defined in detail hereinabove onto which there is superimposed as the surface layers the polymethyl methacrylate sheet as defined in detail hereinabove. In preparing such a laminate assembly, one could utilize first a layer of polymethyl methacrylate, onto which is superimposed a layer of highly plasticized polyvinyl chloride, onto which is superimposed a layer of rigid polyvinyl chloride, followed by a layer of highly plasticized polyvinyl chloride and as the uppermost layer a film of polymethyl methacrylate. Such an assembly of layers can be readily consolidated to a unitary structure by the application of heat and pressure.

In the preparation of the laminates of the present invention whether they be three layered unbalanced structures or five layered balanced structures, a preferred critical relationship exists between the thickness of the interlayer and the thickness of the surface layer in order to achieve optimum properties in substantially all respects namely, the self-extinguishing or non-burning characteristic as well as the impact strength of the ultimate laminate. The thickness ratio between the interlayer and the surface layer for best results may be varied between about 2:1 and 3:1, respectively.

The laminates of the present invention can be prepared in a batch or continuous process. In a batch process the various layers in the assembly, whether three or five, can be inserted into a press and heated for a period of time sufficient to reach the fusion point of the polymethyl methacrylate whereupon the heat and pressure are reduced and upon the cooling of the consolidated assembly the laminate thus produced can be removed from the press in a cool or cold condition and is then ready for use or further processing. In a continuous operation the various components may be extruded in the selected superimposed relationship and brought together through rotating heated rolls for a sufficient period of time and at a temperature sufficiently high to achieve the fusion of the components to a unitary structure followed by passage through cooling rollers so as to emerge in a comparatively cold state where the assembly may be cut automatically to a selected size whereupon the sheets are then ready for use or further processing.

In the base member and in the interlayer a polymer of vinyl chloride is used. This may be homopolymeric vinyl chloride or it may be a copolymer of vinyl chloride with such other monomers as vinyl actate and/or vinylidene chloride. These homopolymers and copolymeric materials are available from a plurality of commercial sources and are frequently referred to as polyvinyl chloride sheeting even when they are copolymeric in character. It is believed that the reason for this is that there is almost invariably a preponderant amount of vinyl chloride in the polymer such as from about 85% to about 100% of the total polymeric material in the composition. These polymers of vinyl chloride, as marketed commercially, are frequently modified by the addition thereto of heat stabilizers, ultraviolet light stabilizers, plasticizers, pigments, fillers and the like to obtain those properties which the additives will confer on the ultimate polymeric product. The molecular weight of the polyvinyl chloride is not critical in the laminated structure of the present invention and may be varied over a substantial range as is described in significant detail in the Modern Plastics Encyclopedia, vol. 38, No. 1A (1960), page 138 and following.

It has been indicated hereinabove that the interlayer of polyvinyl chloride is substantially the same type of material as the core or substrate layer except that it contains a much greater proportion of plasticizer in order to impart a substantial measure of flexibility to the ultimate polyvinyl chloride sheet. The amount of plasticizer used may be varied from about 50% to about 150% based on the weight of the vinyl chloride polymer and preferably about 100% by weight based on the weight of the vinyl chloride polymer. Some of these plasticizers are combustible materials while others are fire retardant. Since the amount of plasticizer used in the core material is generally quite low, i.e., about 10–20% by weight based on the weight of the polyvinyl chloride, it is of no significance whether the combustible or the fire retardant plasticizer are used therein. Since the interlayer sheet is comparatively thin in relationship with the core member, even large amounts of the combustible plasticizer may be used to impart greater flexibility and suppleness to the interlayer film, consequently the use of combustible plasticizers poses no significant problem. However, if desired, the plasticizer used in the interlayer may be a fire retardant plasticizer as the sole plasticizer or a mixture of a normally combustible plasticizer with a fire retardant plasticizer may be used. The fire retardant plasticizers are classified principally as the alkyl phosphates, aryl phosphates or mixed alkyl and aryl phosphates such as tricresyl phosphates, diphenylcresyl phosphate, alkyldiaryl phosphate, trialkyl phosphates, such as trioctylphosphate or chlorinated trialkyl phosphates such as trichloroethyl phosphate. Additionally, other flame retardant agents such as antimony oxide may be used with these fire retardant plasticizers. Another well known class of plasticizers conventionally and commercially used with polymers of vinyl chloride include the phthalic acid esters, such as di-2-ethylhexyl phthalate, dibutyl phthalate, dicapryl phthalate, butyloctyl phthalate, butyldecyl phthalate dioctyl phthalate, and the like. Additionally, the alkyl esters of adipic acid, sebacic acid and azelaic acid and/or polyvinyl acetate may be used as plasticizers. These plasticizing materials, whether combustible or fire retardant, may be used either singly or in combination with one another. Other modifiers and additives may and frequently are used in the polyvinyl chloride compositions including a wide range of inorganic acid derivatives such as basic lead carbonate, organic acid salts, including the alkaline earth salts of fatty acids, the organic metallics, such as the dialkyl tin, carboxylates and mercaptides or completely organic compounds such as the epoxides, polyols, nitrogen derivatives, antitoxidant and ultraviolet absorbers. These additives are treated comprehensively in Modern Plastics Encyclopedia, volume 38, No. 1A (1960), pages 397–423.

The surface or overlay sheet or sheets are preferably homopolymeric methyl methacrylate. One may use, however, copolymeric materials which have a preponderant amount of methyl methacrylate in the copolymer. One may use, for instance, up to about 30% by weight and preferably not more than about 20% by weight of one or more ethylenically unsaturated polymerizable monomers with the methyl methacrylate. These copolymerizable monomers are well known in the prior art and include among others the acrylic and methacrylic acid esters such as methyl acrylate, ethyl acrylate, propyl acrylates, butyl acrylates, ethyl methacrylate, propyl methacrylates, butyl methacrylates, and the like. Additionally, one may use such monomers as acrylonitrile, methacrylonitrile, and the various styrenes including the side and/or ring substituted alkyl and halostyrene as well as styrene per se. These secondary monomers may be used either singly or in combination with one another in copolymerization with the methyl methacrylate.

Whether a homopolymer or copolymer of methyl methacrylate is used to prepare the polymeric film, its molecular weight will range from about 60,000 to about 250,000, and preferably from about 80,000 to about 150,000, as determined by intrinsic viscosity measurements, inasmuch as films prepared from polymers having molecular weights substantially lower than 60,000 will generally be deficient in one or more necessary physical properties, e.g., heat- or solvent-resistance, while films prepared from polymers having molecular weights susbtantially greater than 250,000 can generally be incorporated into the laminate structure only by using temperatures and pressures which may be harmful to the other components of said structure.

It has been indicated hereinabove that one can produce by the process of the present invention either a three or a five ply structure. Variations on these basic three and five ply structure are possible and are contemplated as being within the scope of the invention. Whether a balanced or unbalanced assembly is employed, and the extent to which the basic units are multiplied, will be determined by the end use. Where, for example, the assembly is to be used as a basic supporting structural unit, multiples of the three and/or five ply assembly will be required. Obviously, where a decorative surface is desired, the plasticized vinyl chloride interlayer will be printed with a decorative pattern prior to being compacted with the polymethyl methacrylate overlay and rigid vinyl chloride substrate or core.

The processes by which the sheets of polymethyl methacrylate and plasticized and unplasticized vinyl chloride polymer are fabricated and compacted are not unlike those conventionally practiced in the laminate art. One approach is to preform sheets of each material to the required thickness by calendering techniques if necessary. The thickness of the sheet will be limited only by the adaptability of the equipment. Generally, calendering can provide thickness only up to about 35 mils. Hence, for thicker sheets for the core material, several calendered layers of lower gauge will be required to obtain the final thickness desired. The pre-formed sheets will then be assembled into the requisite number of plies and then heat and pressure-consolidated in a suitable laminating press.

A second approach involves extruding through a flat die to the requisite thickness, a layer of plasticized vinyl chloride polymer onto a base sheet of rigid vinyl chloride polymer. After cooling and hardening, the assembly may be compacted in a laminating press using a PMMA overlay sheet.

As a third approach, a layer of polymethyl methacrylate may be extruded in the same manner on top of the plasticized vinyl chloride layers and then the entire assembly compacted in the laminating press or heated nip rolls. In place of extrusion, various other sheeting techniques may be utilized to obtain layers of the requisite thickness, for example, application by spraying or dipping followed by removal of the excess resin by scrapers, squeeze rolls or air blades. Fluidized bed coating techniques are another means of applying layers of determined thickness to the rigid vinyl chloride substrate or core.

In practicing the process of the present invention, one may utilize temperatures varying between about 135° C. to about 160° C. and preferably from about 140° C. to about 150° C. The amount of pressure utilized will generally vary inversely with the temperatures and may be varied from about 150 p.s.i. to about 1500 p.s.i. and preferably from about 500 to about 750 p.s.i. The time required to effect the conversion of the separate laminae to a unitary consolidated structure will depend almost completely upon the temperature and pressure used in a particular operation. This may vary from a few seconds to 10 or 15 minutes. It should be sufficient to say that the time involved will be that measure of time required for the assembly to reach the fusion point of the highest softening point of any member in the assembly. After consolidating and the fusion has been achieved, the laminate is cooled immediately to a temperature to less than about 50° C. and preferably to room temperature before being removed from the press.

If perfectly clear laminates are desired, such as for use in window glass or as a transparent protective covering for an advertising sign, the components used should be unfilled and undecorated so as to provide a clear, transparent lamiante. However, when a decorated laminate is desired, it is preferred to put the selected design and/or messages on the highly plasticized interlayer before making up the assembly. The decorative laminates of the present invention may be used directly as flat sheets such as for external wall coverings or they may be further processed by a heat and pressure deformation step so as to convert the structure to a particular contoured configuration. Since this laminate is thermoplastic, no difficulty is experienced in such a deformation step.

In order that the concept of the present invention may be more completely understood, the following examples are set forth. These examples are given by way of illustration only and any specific enumeration or detail contained therein should not be interpreted as a limitation on the case except as is indicated in the appended claims.

EXAMPLE 1

A 50 mil thick sheet of clear, rigid polyvinyl chloride having a flexural strength of approximately 15,000 p.s.i., is placed on a polished stainless steel press plate. Superimposed on the rigid sheet is a film of a 5 mil thick, decorated, highly flexible polyvinyl chloride. Finally, an upper layer of a 3 mil thick film of extruded polymethyl methacrylate is superimposed on the printed flexible polyvinyl chloride film. Another polished press plate is placed upon the polymethyl methacrylate film and the laminae assembly is heat- and pressure-consolidated at 500 p.s.i. until a maximum temperature of 140° C. is reached. After reaching 140° C. (approximately 8 minutes), the laminate is cooled immediately to room temperature and removed from the press. The laminate thickness is 55 mils. A strip is inserted in a flame until combustion began, thereupon, the laminate is removed from the flame and the burning ceases almost instantaneously.

COMPARATIVE EXAMPLE II

A 9 mil thick film of extruded polymethyl methacrylate as in Example I is superimposed on each side of a sheet of a 45 mil thick rigid polyvinyl chloride also described in Example I. The assembly is pressed between polished stainless steel press plates and heat- and pressure-consolidated as before. The resultant balanced laminate is 61 mils thick and when subjected to the Izod impact test, showed a value of 0.134 ft. lb. per hundred mils thickness. In the flame test, the laminate is self-extinguishing.

EXAMPLE III

Example I is repeated in substantially all details except that a 5 member balanced laminate is prepared using a 45 mil thick rigid polyvinyl chloride core, an interlayer of a copolymer of vinyl chloride and vinyl acetate in the form of a 16 mil thick film with surface layers of a 9 mil extruded polymethyl methacrylate film. The resultant laminate is 88 mils thick. The maximum Izod impact strength is 0.445 ft. lb. per hundred mils thickness. The laminate, when subjected to the flame test, extinguishes itself almost immediately.

COMPARATIVE EXAMPLE IV

Comparative Example II was repeated in all essential details except that the rigid core sheet of polyvinyl chloride is 100 mils thick and the surface layers of the polymethyl methacrylate are 80 mil thick extruded sheets. After the heat- and pressure-consolidation step, the resultant laminate is about 250 mils thick and when subjected to the burning test, the laminate continues to burn readily after removal from the flame.

A series of balanced laminate constructions having a total of 5 layers were prepared. In each of these laminates there is a core member, two layers, one on each side of the core and two surface layers, one on each side of the interlayer. The thicknesses of the various layers were varied and after the total assembly was heat and pressure consolidated to a unitary structure, the separate laminates were subjected to flammability tests. The results of the tests are shown hereinbelow in Table I.

Table I

| Thickness Rigid PVC Core, Mils | Thickness PMMA Surface, Mils per Side | Thickness Interlayer, Mils per Side | Flammability |
|---|---|---|---|
| 45 | 9 | 8 | Self Extinguishing. |
| 45 | 9 | 16 | Do. |
| 45 | 9 | 24 | Do. |
| 135 | 3 | 8 | Non Burning. |
| 135 | 9 | 24 | Do. |

A further series of 5-ply balanced laminates were prepared and were subjected to Izod impact strength tests. The results of those tests are shown hereinbelow in Table II.

Table II

| Thickness Rigid PVC Core, Mils | Thickness PMMA Surface, Mils per Side | Thickness Interlayer Mils per Side | Izod Impact Strength, Ft. Lbs. per 100 mils |
|---|---|---|---|
| 45 | 3 | 8 | 0.433 |
| 45 | 3 | 12 | 0.358 |
| 45 | 9 | 16 | 0.445 |
| 45 | 9 | 24 | 0.577 |
| 135 | 3 | 8 | 0.594 |
| 135 | 9 | 24 | 0.828 |
| 45 | 3 | 0 | 0.141 |
| 45 | 0 | 0 | 0.410 |
| 45 | 9 | 0 | 0.134 |
| 135 | 0 | 0 | 0.734 |
| 135 | 3 | 0 | 0.154 |
| 135 | 9 | 0 | 0.141 |

The burning tests referred to hereinabove are standardized tests as set forth in the A.S.T.M. test D 635–56T. This testing system provides a definition for self-extingishing as well as non-burning materials. When the thickness ratio between the core and the surface layers is 4:1, the laminate will be self-extinguishing. If a non-burning laminate is desired, the thickness ratio between the core and the surface layer should be at least 9:1, respectively.

In Table II the impact test was conducted on unnotched specimens with the force striking the face of the specimens.

I claim:
1. A high impact strength, combustion resistant self-extinguishing unitary heat- and pressure-consolidated laminated article comprising
   (I) a rigidity-imparting high impact vinyl chloride polymer substrate of from about 40 to 250 mils in thickness,
   (II) a highly plasticized vinyl chloride polymer interlayer of from about 2 to 25 mils in thickness, and
   (III) a polymethylmethacrylate overlay sheet of from about 1 to 15 mils in thickness, the ratio of thickness between (I) and (III) being at least 4:1, respectively.
2. A high impact strength, combustion resistant self-extinguishing unitary heat- and pressure-consolidated laminated article comprising
   (I) a rigidity-imparting high impart vinyl chloride polymer substrate of from about 60 to 150 mils in thickness,
   (II) a highly plasticized vinyl chloride polymer interlayer of from about 2 to 25 mils in thickness, and
   (III) a polymethylmethacrylate overlay sheet of from about 1 to 15 mils in thickness.
3. A high impact strength, combustion resistant self-extinguishing unitary heat- and pressure-consolidated laminated article comprising
   (I) a rigidity-imparting high impact vinyl chloride polymer substrate of from about 60 to 150 mils in thickness,
   (II) a highly plasticized vinyl chloride polymer interlayer of from about 3 to 9 mils in thickness, and
   (III) a polymethylmethacrylate overlay sheet of from about 3 to 7 mils in thickness.
4. A high impact strength, combustion resistant self-extinguishing unitary heat- and pressure-consolidated laminated article comprising
   (I) a rigidity-imparting high impact vinyl chloride polymer core member of from about 40 to 250 mils in thickness,
   (II) directly bonded to each side of said core member, a highly plasticized vinyl chloride polymer sheet of from about 2 to 25 mils in thickness, and
   (III) overlaying each of said sheets, a polymethylmethyacrylate sheet of from about 1 to 15 mils in thickness, the ratio of thickness between (I) and (III) being at least 4:1, respectively.
5. A high impact strength, combustion resistant self-extinguishing unitary heat- and pressure-consolidated laminated article comprising
   (I) a rigidity-imparting high impact vinyl chloride polymer core member of from about 60 to 150 mils in thickness,
   (II) directly bonded to each side of said core member, a highly plasticized vinyl chloride polymer sheet of from about 2 to 25 mils in thickness, and
   (III) overlaying each of said sheets, a polymethylmethacrylate sheet of from about 1 to 15 mils in thickness.
6. A high impact strength, combustion resistant self-extinguishing unitary heat- and pressure-consolidated laminated article comprising
   (I) a rigidity-imparting high impact vinyl chloride polymer core member of from 60 to 150 mils in thickness,
   (II) directly bonded to each side of said core member, a highly plasticized vinyl chloride polymer sheet of from about 3 to 9 mils in thickness, and
   (III) overlaying each of said sheets, a polymethylmethacrylate sheet of from about 3 to 7 mils in thickness.

References Cited by the Examiner
UNITED STATES PATENTS

| 2,444,059 | 6/48 | Neher et al. | 161—254 |
| 2,748,042 | 5/56 | Borgese | 161—254 X |
| 2,956,915 | 10/60 | Korn et al. | |
| 3,075,863 | 1/63 | Frey | 161—165 X |

ALEXANDER WYMAN, Primary Examiner.

MORRIS SUSSMAN, Examiner.